(12) United States Patent
Cai et al.

(10) Patent No.: US 8,114,242 B2
(45) Date of Patent: Feb. 14, 2012

(54) DIMENSION-SET METHOD FOR JOINING PARTS

(75) Inventors: Wayne W. Cai, Troy, MI (US); Paul J. Tyckoski, Romeo, MI (US); Tao Xie, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 110 days.

(21) Appl. No.: 12/469,970

(22) Filed: May 21, 2009

(65) Prior Publication Data

US 2010/0294420 A1 Nov. 25, 2010

(51) Int. Cl.
*B32B 37/14* (2006.01)

(52) U.S. Cl. .......................... 156/295; 156/310; 156/314

(58) Field of Classification Search .......... 156/313–319, 156/295, 310; 428/343, 346, 347, 349, 350, 428/354
See application file for complete search history.

(56) References Cited

U.S. PATENT DOCUMENTS

| | | | | |
|---|---|---|---|---|
| 3,562,064 A * | 2/1971 | Rost et al. | ...................... | 156/474 |
| 4,051,286 A * | 9/1977 | Abbott | ............................. | 428/77 |
| 4,614,022 A * | 9/1986 | Bibby et al. | ..................... | 29/596 |
| 4,616,265 A * | 10/1986 | Lyden | ............................ | 348/829 |
| 4,793,886 A * | 12/1988 | Okamura et al. | .......... | 156/307.3 |
| 4,826,239 A * | 5/1989 | Nishikawa et al. | ........... | 296/218 |
| 5,451,742 A * | 9/1995 | Nishio et al. | ............. | 219/121.64 |
| 5,476,712 A * | 12/1995 | Hartman et al. | ........... | 428/317.3 |
| 5,568,713 A * | 10/1996 | Gagne et al. | .................. | 52/785.1 |
| 5,888,335 A * | 3/1999 | Kobe et al. | .................. | 156/306.3 |
| 6,447,631 B1* | 9/2002 | Schahl et al. | .............. | 156/304.1 |
| 6,915,573 B2* | 7/2005 | Mullet | ........................ | 29/897.32 |
| 7,007,368 B2* | 3/2006 | Sovoda | ............................ | 29/509 |
| 7,043,816 B2* | 5/2006 | Zaluzec et al. | ................... | 29/460 |
| 7,770,955 B2* | 8/2010 | Kleber et al. | .................... | 296/29 |
| 2004/0185249 A1* | 9/2004 | Junghans et al. | ............. | 428/354 |
| 2004/0241323 A1* | 12/2004 | Ylitalo et al. | ................. | 427/258 |
| 2005/0126093 A1* | 6/2005 | Wagner et al. | ............. | 52/204.53 |
| 2006/0188706 A1* | 8/2006 | Kobayashi et al. | ........ | 428/317.1 |

* cited by examiner

*Primary Examiner* — Khanh P Nguyen
*Assistant Examiner* — John Blades
(74) *Attorney, Agent, or Firm* — Quinn Law Group, PLLC

(57) ABSTRACT

A method for joining first and second parts includes applying a structural adhesive, configured to form a permanent bond when subjected to a permanent-curing process, to one of the parts. A dimension-set adhesive is applied to join the parts, and is configured to fix the dimensions of the parts. The parts are not subjected to a mechanical fastening process or a welding process, and the structural adhesive is not subjected to a partial-curing process prior to the permanent-curing process. A permanent bond is formed between the parts with the structural adhesive by subjecting the parts to the permanent-curing process. The dimension-set adhesive may be isolated from the structural adhesive, or may be surrounded by the structural adhesive. An extended tab portion may be formed on one of the parts, and the dimension-set adhesive located thereon.

16 Claims, 4 Drawing Sheets

DIMENSION-SET METHOD FOR JOINING PARTS

TECHNICAL FIELD

This disclosure concerns joining parts or components during manufacturing processes involving structural adhesives.

BACKGROUND OF THE INVENTION

Components of automobiles, and other industrial equipment, may be assembled together by joining, which generally includes welding, mechanical fasteners, or bonding. Welding involves melting and re-solidifying portions of the joined components in order to form a permanent bond, either along a seam or in multiple spots. Welding visually and structurally alters the material adjacent to the weld. Mechanical fasteners, such as rivets, bolts and screws, often pierce the material of the components or are inserted through holes formed therein. Mechanical fastening also visually and structurally alter the material adjacent to the interface between the components.

Structural adhesives may be used to form structural bonds between automotive or industrial vehicle components. The adhesives require a curing process, often in the form of heating in an oven (such as a paint oven) or an induction-curing process on the assembly line. The adhesive often needs to stay in place when subjected to other down-stream assembly or manufacturing processes.

SUMMARY

A method for joining a first part and a second part is provided. The method includes applying a structural adhesive to one of the first and second parts. The structural adhesive is configured to form a permanent bond between the first and second parts when subjected to a permanent-curing process, such as oven curing. However, the structural adhesive is not configured to fix the dimensions of the first and second parts prior to the permanent-curing process. A dimension-set adhesive is applied to at least one of the first and second parts. The dimension-set adhesive is configured to fix the dimensions of the first and second parts prior to the permanent-curing process.

The first and second parts are not subjected to a mechanical fastening process or a welding process, which is characterized by a requirement for access from opposing sides of the joined first and second parts. Nor is the structural adhesive subjected to a partial-curing process, such as induction curing, prior to the permanent-curing process. A permanent bond is then formed between the first and second parts with the structural adhesive by subjecting the first and second parts (and therefore the structural adhesive) to the permanent-curing process.

The dimension-set adhesive may be isolated from the structural adhesive. An extended tab portion may be formed on one of the first and second parts, and the dimension-set adhesive located on, or applied to, the extended tab portion. Alternatively, the dimension-set adhesive may be substantially surrounded by the structural adhesive. The dimension-set adhesive may have a first thickness and the structural adhesive a second thickness; the first thickness being greater than the second thickness. Joining the first and second parts with the dimension-set adhesive may include compressing the dimension-set adhesive between the first and second parts to a third thickness, which is less than the second thickness.

The above features and advantages and other features and advantages of the present invention are readily apparent from the following detailed description of the best modes and other embodiments for carrying out the invention when taken in connection with the accompanying drawings.

DESCRIPTION OF PREFERRED EMBODIMENTS

Figure 1:
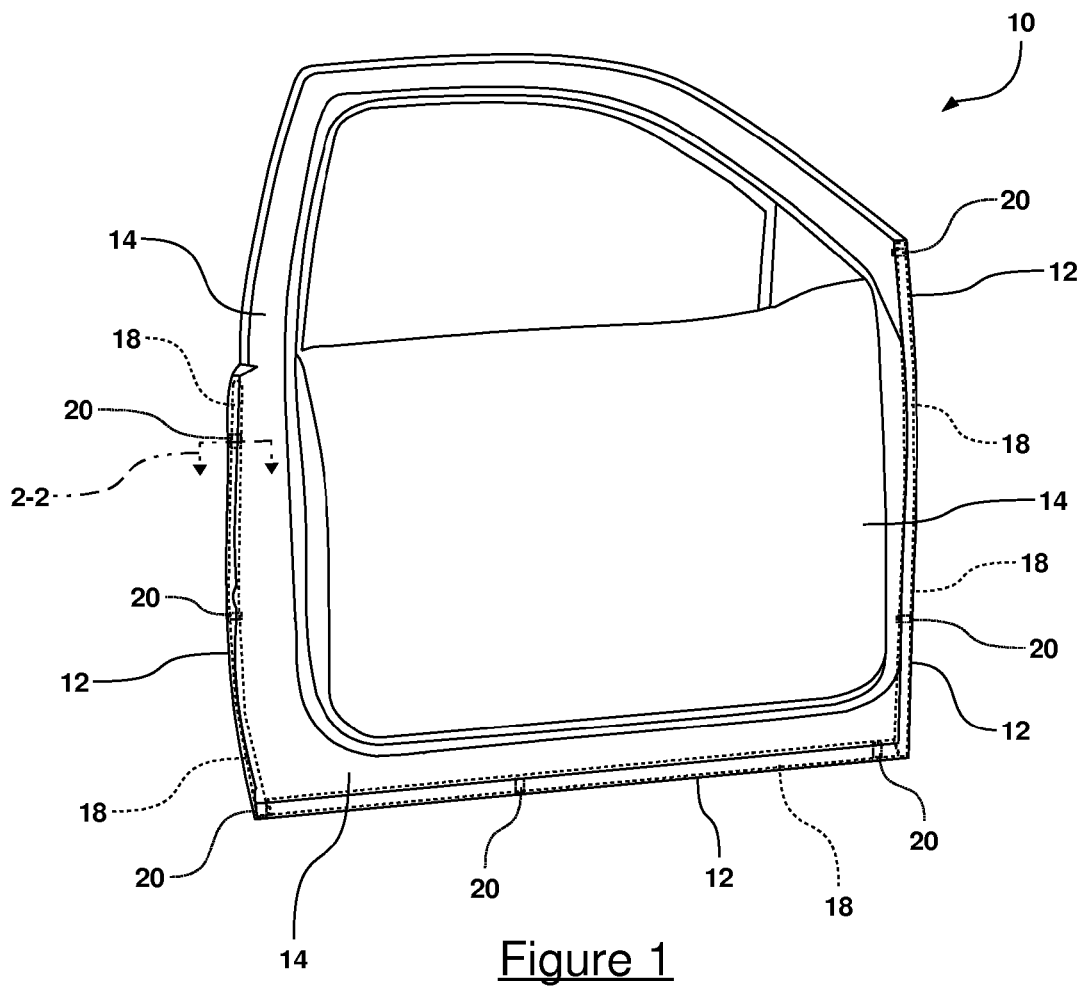
FIG. 1 is a schematic side view of a two-piece, hemmed door construction.

Referring to the drawings, wherein like reference numbers correspond to like or similar components throughout the several figures, there is shown in FIG. 1 a workpiece or door 10 usable in accordance with the invention defined in the appended claims. In addition to vehicle doors, other workpieces may be formed in accordance with the invention as defined in the appended claims; such as, and without limitation: pillars may be joined to chassis; bottom construction; roof structure may be joined to roof panels or sheets; front walls; or other workpieces and components recognizable to those having ordinary skill in the art. Furthermore, the processes and methods discussed herein may be applied to numerous materials suitable for joining with structural adhesives, and may apply to joining of components made from different materials.

While the present invention is described in detail with respect to automotive applications, those skilled in the art will recognize the broader applicability of the invention. Those having ordinary skill in the art will further recognize that terms such as "above," "below," "upward," "downward," et cetera, are used descriptively of the figures, and do not represent limitations on the scope of the invention, as defined by the appended claims.

The door 10 is assembled from at least two primary components, in this configuration an outer panel and an inner panel, which are referred to herein as a first part 12 and a second part 14. After the first and second parts 12, 14 are brought together in an assembly or manufacturing facility, they are permanently attached or joined together to form the final door 10.

Figure 2:
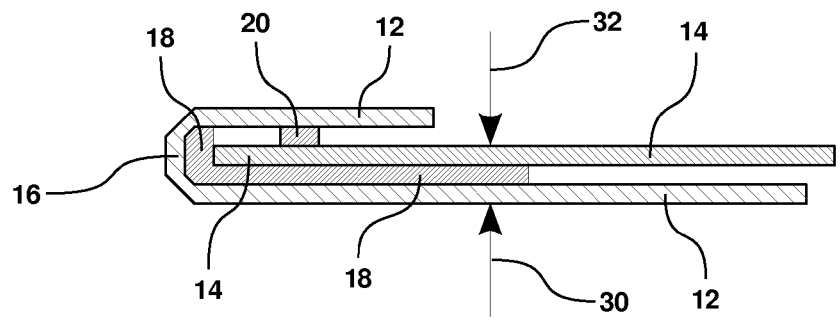
FIG. 2 is a schematic cross-section of a portion of the door shown in FIG. 1, taken across line 2-2.

Referring now to FIG. 2, and with continued reference to FIG. 1, there is shown a schematic cross-section of a portion of the door 10 shown in FIG. 1, taken across line 2-2. The joining process for door 10 may include hemming, which involves deforming a portion of the first part 12 over a portion of the second part 14. First part 12 is deformed along a hemming portion or hem line 16, such that portions of first part 12 overlap or encase a portion of second part 14.

Permanent attachment of first part 12 to second part 14 occurs by applying a structural adhesive 18 to one of the first and second parts 12, 14. The structural adhesive 18 is configured to form a permanent bond between the first and second parts 12, 14 when subjected to a permanent-curing process. One form of permanent curing is an oven-curing process (which may also be referred to as baking or simply heat curing). Another form of permanent curing is induction curing, in which the workpiece is subjected to induction curing and then allowed to naturally cure for an extended time, often several hours or more. Furthermore, induction curing requires additional equipment and an additional space or station on the assembly/manufacturing line.

The structural adhesive 18 will not bond the first and second parts 12, 14 until subjected to the permanent-curing process, and will not hold or fix the dimensions of the first and second parts 12, 14 relative to each other. Therefore, unless the first and second parts 12, 14 are immediately placed into the oven, an additional mechanism or process is used to hold or fix the dimensions of the assembled first and second parts 12, 14 until the permanent-curing process may be applied, such as oven-curing in the paint oven.

Possible mechanisms for fixing or setting the dimensions of the first and second parts 12, 14 until the oven-curing process include spot welding, riveting, or clinching the first and second parts 12, 14 together. Alternatively, the structural adhesive 18 may be subjected to a pre-curing or partial-curing process, such as induction curing (for a non-extended period of time), which will cure the structural adhesive 18 sufficiently to set the dimension of the first and second parts 12, 14 but will not cure the structural adhesive 18 sufficiently to permanently and structurally bond the first and second parts 12, 14 (e.g. the permanent-curing process will still be required for the final door 10). However, induction curing requires additional equipment and an additional space or station on the assembly/manufacturing line.

Mechanical fastening processes (such as riveting or clinching) and welding processes mar or significantly deface any Class A surfaces of the door 10. Class A surfaces are the physical surfaces the end user can feel, touch, and see; and therefore must meet cosmetic and aesthetic standards. With the doors and windows closed, the exterior surfaces of a vehicle are considered Class A surfaces. Interior trim, such as the exposed portions of the dash board or other interior panels, may also be considered Class A surfaces. The Class A surfaces may be ruined if they are marred by weld marks, rivet heads, rivet holes, or clinching indentations. For the door 10 shown in FIGS. 1 and 2, the outside portion of the first part 12—shown facing downward in FIG. 2—may be a Class A surface.

In order to maintain the Class A surfaces during the assembly of the first and second parts 12, 14, a dimension-set adhesive 20 is applied to at least one of the first and second parts 12, 14. The first and second parts 12, 14 are then joined with the dimension-set adhesive 20, creating a temporary, non-structural bond between the first and second parts 12, 14.

The dimension-set adhesive 20 may be configured such that it will not form a permanent bond between the first and second parts 12, 14 and, therefore, the dimension-set adhesive 20 typically is not used as the only adhesive and cannot replace the structural adhesive 18. However, the dimension-set adhesive 20 is configured to fix or hold the dimensions of the first and second parts 12, 14 relative to each other. In order to properly align and hold the first and second parts 12, 14 in preparation for oven-curing, the dimension-set adhesive 20 may need to maintain the first and second parts 12, 14 with precise limits of allowable relative movement therebetween.

The dimension-set adhesive 20 replaces other joining methods used to set the dimensions of the first and second parts 12, 14; such as (without limitation) welding, mechanical fastening, or induction curing.

In the configuration shown in FIGS. 1 and 2, the door 10 may be formed or assembled by attaching the dimension-set adhesive 20 to either the first part 12 or the second part 14 and then deforming the first part 12 along hem line 16. After hemming, the dimension-set adhesive 20 is in contact with both the first and second parts 12, 14, and the dimensions of the main components of the door 10 are fixed relative to each other.

The dimension-set adhesive 20 allows further processes on the door 10 to occur without altering the proper alignment of the first and second parts 12, 14. Furthermore, the door 10 may be transferred to an additional area or manufacturing facility before subjecting the door 10 to the oven-curing process. For example, the dimension-set adhesive 20 may be applied to either of the first and second parts 12, 14 at a first facility, the first and second parts 12, 14 may be joined with the dimension-set adhesive 20 at a second facility, and the permanent bond may be formed by oven-curing at a third facility.

The dimension-set adhesive 20 allows temporary assembly of the door 10 without subjecting the structural adhesive 18 to a partial-curing process, such as induction curing, prior to the oven-curing process. Those having ordinary skill in the art will recognize that, in this context, partial-curing does not include simple air-curing or time-curing processes, which may be unavoidable for some types of structural adhesives.

Additionally, the dimension-set adhesive 20 does not damage or mar the Class A surfaces. Therefore, the Class A surface (which may be formed on either side of the first or second parts 12, 14) may have a first surface quality before joining the first and second parts 12, 14 with the dimension-set adhesive 20, and a second surface quality after the dimension-set adhesive 20 joining process. One having ordinary skill in the art would be able to recognize that the first surface quality and the second surface quality are substantially equivalent; e.g. there is no degradation of the cosmetic and aesthetic qualities of the Class A surface caused by joining the first and second parts 12, 14 with the dimension-set adhesive 20. The second surface quality would be substantially equal to the first surface quality, because setting the dimensions did not require deforming, marring, or otherwise damaging the Class A surface.

The dimension-set adhesive 20 also does not require any of the mechanical fastening processes, such as riveting or clinching. Nor does the dimension-set adhesive 20 require any welding processes. Unlike the dimension-set adhesive 20, the mechanical fastening or welding processes require double-sided access to the door 10—e.g. access from both of the opposing sides (shown schematically in FIG. 2 as arrows 30, 32) of the joined first and second parts 12, 14.

The door 10 may then be moved to the oven, which may also be the paint oven used for drying, curing, or baking the exterior paint of the door 10. Oven-curing the door 10 forms a permanent, structural bond between the first and second parts 12, 14.

As best viewed in FIG. 2, the dimension-set adhesive 20 may be isolated from the structural adhesive 18, such that the two adhesive types do not come into contact. This configuration may be used when the structural adhesive 18 is capable of causing the dimension-set adhesive 20 to fail, either by chemically altering or weakening the dimension-set adhesive 20 or by interfering with the adhesion surface(s) between the dimension-set adhesive 20 and the first and second parts 12, 14.

One dimension-set adhesive 20 suitable for the configuration shown in FIGS. 1 and 2 is an industrial double-sided tape, such as pressure tape or water-activated tape, and may be a double-sided foam tape. The double-sided tape may first be attached to either the first or second parts 12, 14 and then the door 10 assembled as the first and second parts 12, 14 are pressed together. The amount of force required to adhere the doubled-sided tape (or other dimension-set adhesive 20) will depend upon, among other factors: the materials used for first and second parts 12, 14; the specific type of double-sided tape; the contours of the interface between the double-sided tape and first and second parts 12, 14; the surface conditions of parts; and the type of adhesive on the double-sided tape.

Figure 3:
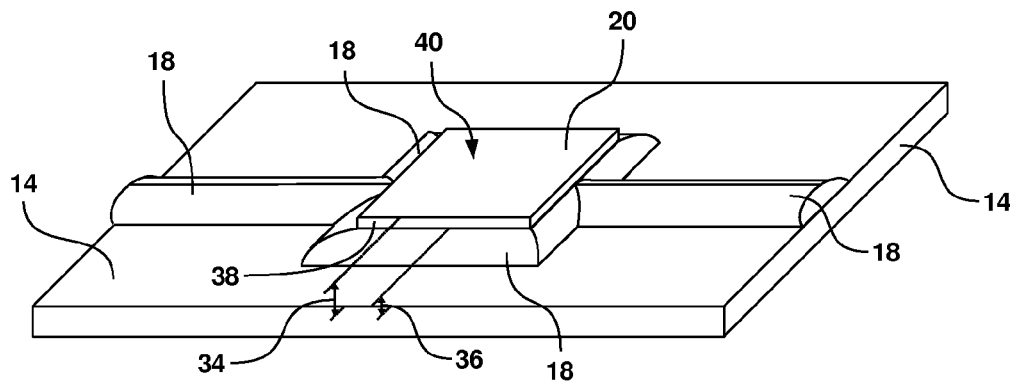
FIG. 3 is a schematic isometric view of structural adhesive surrounding dimension-set adhesive.

Referring now to FIG. 3, and with continued reference to FIGS. 1 and 2, there is shown a schematic depiction of a portion of the second part 14 having the dimension-set adhesive 20 attached thereto. However, unlike the configuration shown in FIGS. 1 and 2, the structural adhesive 18 shown in FIG. 3 surrounds the dimension-set adhesive 20.

Substantially surrounding dimension-set adhesive 20 with the structural adhesive 18 may create a risk of interference with adhesion between dimension-set adhesive 20 and the first and second parts 12, 14. Therefore, the dimension-set adhesive 20 may first be applied to the second part 14, then the structural adhesive 18 applied, and finally the first part 12 pressed onto the dimension-set adhesive 20.

The dimension-set adhesive 20 has a first thickness 34 and the structural adhesive 18 has a second thickness 36. To prevent the structural adhesive 18 from flowing between the dimension-set adhesive 20 and the first part 12, the first thickness 34 is greater than the second thickness 36. The workpiece (such as a door 10 or another adhesively-bonded workpiece) may be assembled by applying the structural adhesive 18 up to the second thickness 36 and then joining the first part 12 to the dimension-set adhesive 20 to create an adhesive seal therebetween. The dimension-set adhesive 20 is then compressed to a third thickness, which is less than the first thickness 34, and may be less than the second thickness 36.

The dimension-set adhesive 20 may include a compressible foam core portion 38. The dimension-set adhesive 20 may be a double-sided tape having the foam core portion 38 incorporated between adhesive layers 40 (only one of which is viewable in FIG. 3) which contact the first and second parts 12, 14. Under sufficient pressure, the foam core will compress, allowing the dimensions between the first and second parts 12, 14 to be fixed by the dimension-set adhesive 20. Other compressible materials may be used for the core portion, such as (without limitation) plastic or rubber.

Another dimension-set adhesive 20 usable with the configurations shown in FIGS. 1-3 is formed from a hook-and-loop core 38 with two adhesive layers 40. The hook-and-loop core 38, such as VELCRO, may be separated and the adhesive layers 40 attached individually to the first and second parts 12, 14. The first and second parts 12, 14 are then attached, and the dimensions fixed, by pressing the hook-and-loop core 38 back together with sufficient force to lock the core 38 together.

Figure 4A:
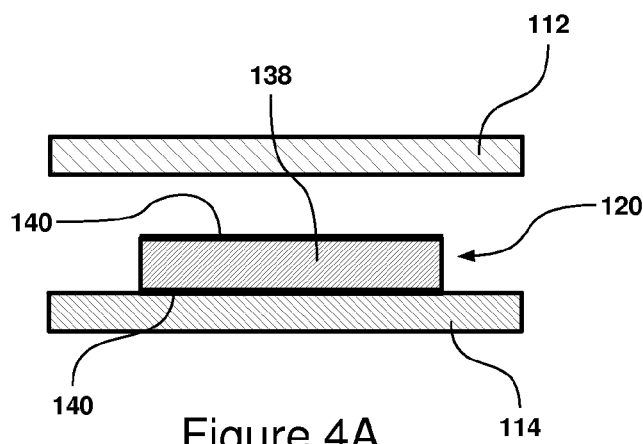
FIG. 4A is a schematic side view of a workpiece having a semi-solid adhesive applied before being dimension-set.
Figure 4B:
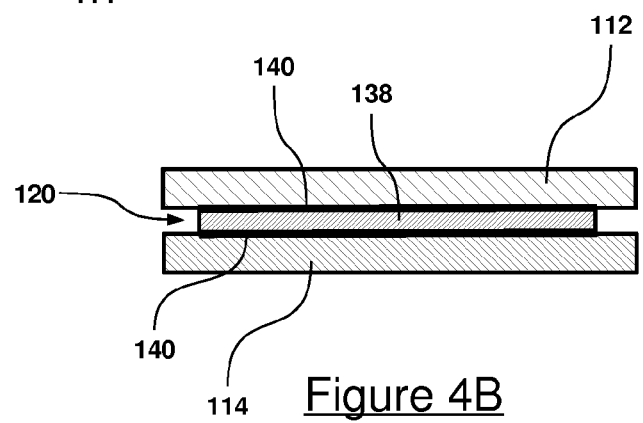
FIG. 4B is a schematic side view of the workpiece of FIG. 4A after the semi-solid adhesive has been formed and the dimensions fixed.

Referring now to FIGS. 4A and 4B, there is shown a schematic view of another type of dimension-set adhesive, a semi-solid adhesive 120. This semi-solid adhesive 120 includes a semi-solid adhesive core portion 138 with at least two adhesive layers 140. The semi-solid adhesive 120 may also be referred to as a dry adhesive. Dry adhesives, generally, have the capability of holding shape after being deformed (as occurs in plastic deformation), as opposed to springing back to their pre-deformation shape (as in elastic deformation). The individual surfaces of the dry adhesive are capable of deforming to match the corresponding surface contours and surface finish of the parts to which the dry adhesive is attached.

The core portion 138 may be formed from a shape memory polymer (SMP) which undergoes a phase change from being solid to being soft when heated above its transformation temperature. Other shape memory materials may be used as the core portion 138, as would be recognized by those having ordinary skill in the art.

The adhesive layers 140 may be formed from a water-based adhesive, such as polyvinyl alcohol, and may substantially cover the core portion 138, such that a coating is formed around the core portion 138. The adhesive layers 140 may also be formed from a hot-melt adhesive, such as poly(ethylene-vinylacetate), which is also known and referred to as EVA, and may substantially cover the core portion 138, such that a hot-melt adhesive coating is formed around the core portion 138.

FIG. 4A shows the semi-solid adhesive 120 applied to a second part 114, before the dimensions of a first part 112 are set relative to the second part 114. The joining process for such workpieces may include preheating the semi-solid adhesive 120, such that the SMP core portion 138 becomes soft and compressible. Then, a small amount of solvent (such as water or isopropanol) is sprayed onto the semi-solid adhesive 120 to activate the adhesive layers 140. The adhesive layers 140 are therefore easily activated in preparation for assembly or joining of the first and second parts 112, 114.

FIG. 4B shows the semi-solid adhesive 120 after the first part 112 has been applied to the semi-solid adhesive 120 and the SMP core portion 138 is compressed between the first and second parts 112, 114. After a short cooling period, SMP core portion 138 of the semi-solid adhesive 120 will transition below the glass temperature and solidify in its compressed shape. Because the adhesive layers 140 are thin, compared to the overall size of the semi-solid adhesive 120, the adhesive layers 140 will also have dried and formed a temporary bond to the first and second parts 12, 114 in the same amount of time.

After clamping force or pressure is released from the first and second parts 112, 114, the semi-solid adhesive 120 will maintain its compressed shape and the dimensions of the first and second parts 112, 114, relative to each other, will be fixed. A structural adhesive (not shown in FIGS. 4A and 4B) may be applied before, concurrently with, or after application of the semi-solid (dimension-set) adhesive 120, as described above. The workpiece may then be safely moved to the oven-curing process without altering the dimensions of the first and second parts 112, 114 relative to each other.

Figure 5A:
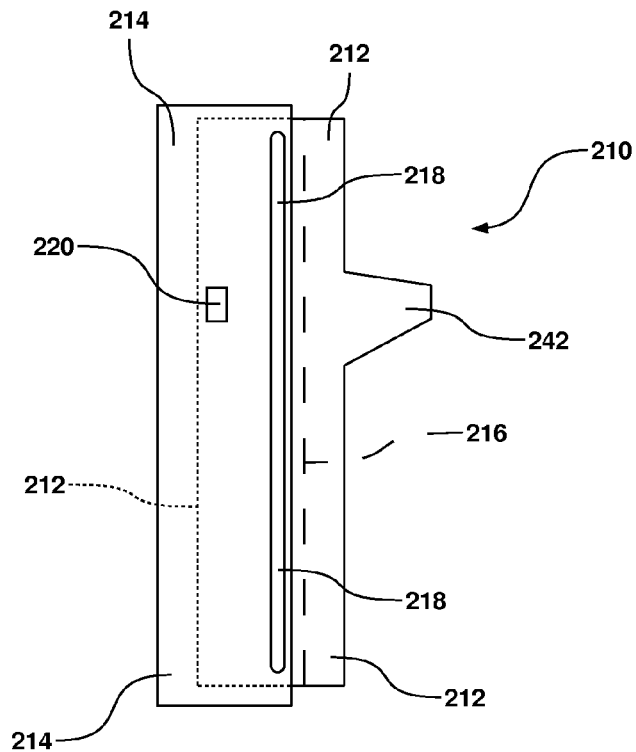
FIG. 5A is a schematic side view of a portion of a workpiece before hemming, showing an extended tab portion on one part.
Figure 5B:
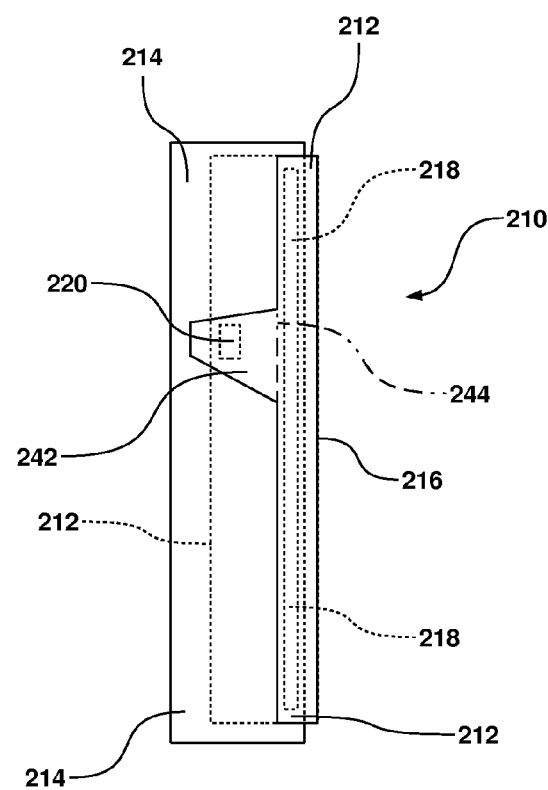
FIG. 5B is a schematic side view of the workpiece shown in FIG. 5A, showing the workpiece after hemming.

Referring now to FIGS. 5A and 5B, and with continued reference to FIGS. 1-4B, there is shown a modification of a portion of a hemmed workpiece 210, similar to portions of the door 10 shown in FIGS. 1 and 2. FIG. 5A shows the workpiece 210 before hemming and FIG. 5B shows the workpiece 210 after hemming.

A first part 212 is deformed along a hem line 216 and folded over a second part 214. The first and second parts 212, 214 are held together by a dimension-set adhesive 220 until a structural adhesive 218 can be cured in an oven-curing process (such as a paint oven) to permanently, structural bond the first and second parts 212, 214 together.

The first part 212 further includes an extended tab portion 242 extending to the right of the first part 212 in FIG. 5A and the left in FIG. 5B. The extended tab portion 242 is configured to isolate a portion of the first part 212 away from the structural adhesive 218 and provide an interface area to bond with the dimension-set adhesive 220. Without the extended tab portion 242, the first part 212 would extend only to line 244, and the dimension-set adhesive 220 would have to be moved closer to the hem line 216. This configuration better allows the dimension-set adhesive 220 to be isolated from the structural adhesive 218 by providing the extended tab portion 242 as an isolated attachment interface between the dimension-set adhesive 220 and the first part 212.

Additional design elements may be added to the first and second parts 212, 214 in order to facilitate joining with the dimension-set adhesive 220. For example, and without limitation, a depression (not shown) may be formed in the first part 212 in order to locally reduce the gap between the first and second parts 212, 214 and ensure proper contact between the dimension-set adhesive 220 and the first and second parts 212, 214.

Figure 6:
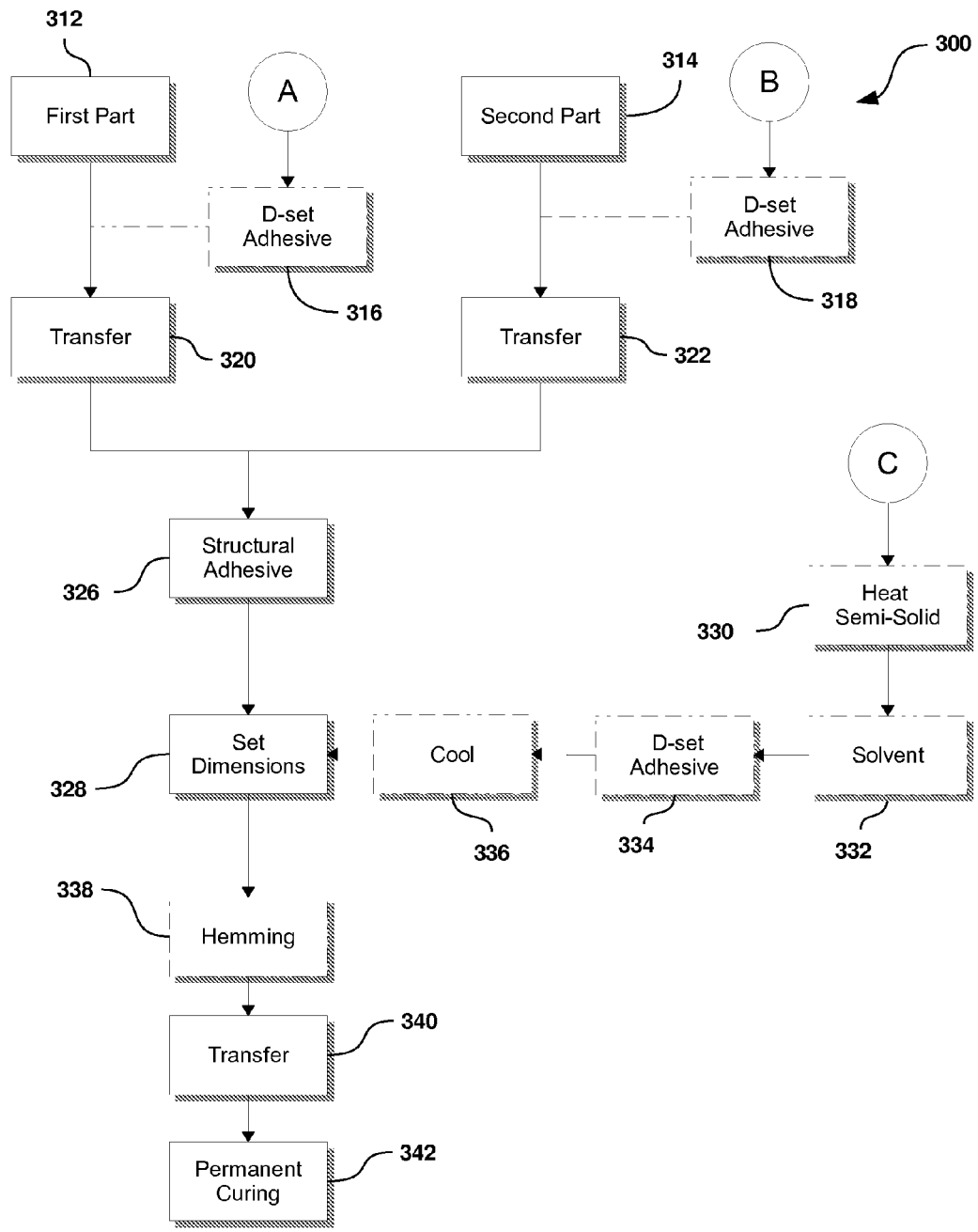
FIG. 6 is schematic flow chart or algorithm for a method of joining first part and second parts with dimension-set and structural adhesives.

Referring now to FIG. 6, and with continued reference to FIGS. 1-5B, there is shown a method 300 for joining parts without piercing or marring the parts. For illustrative purposes, the method 300 is described with reference to many of the structures and components shown and described in relation to FIGS. 1-5B. However, those having ordinary skill in the art will recognize other structures which may be used to practice the method 300 and the invention as defined in the appended claims. Those having ordinary skill will further recognize that the exact order of the steps of the method 300 shown in FIG. 6 is not required and steps may reordered, steps may be omitted, and additional steps may be included.

In steps 312 and 314, the first and second parts 12, 14 are formed. The first and second parts 12, 14 may be formed in separate facilities, on separate manufacturing lines, or in the same process. The method 300 includes three alternative processes—paths A, B, or C—for attaching the dimension-set adhesive 20, 120, or 220 to one of the first and second parts 12, 14. Dimension-set adhesive may be shortened to "D-set," herein. The three paths may be substituted, interchanged, or even combined.

Path A includes step 316, in which the dimension-set adhesive 20 is applied to the first part 12. Path B includes step 318, in which the dimension-set adhesive 20 is applied to the second part 14. Paths A and B may both occur at a first facility, or may occur at separate facilities (such as those of separate suppliers). Application of the dimension-set adhesive 20 by suppliers of the first and second parts 12, 14 may reduce the assembly time for the workpiece and may reduce the total amount of time required for method 300.

Steps 320 and 322 involve transferring the first and second parts 12, 14 to a second, common facility. Alternatively, steps 320 and 322 may involve transferring the first and second parts 12, 14 to a common area in the first facility. The first and second parts 12, 14 are brought together in preparation for joining and assembly and the structural adhesive is applied in step 326.

The dimensions may then be set in step 328 by joining the first and second parts 12, 14 with the dimension-set adhesive 20. As discussed above, step 328 does not involve piercing or marring the first and second parts 12, 14, and no spot welds are used to join the first and second parts 12, 14. Furthermore, step 328 does not require access from opposing sides of first and second parts 12, 14—e.g. does not require double-sided access—and does not require a pre-cure process (such as induction curing). Some embodiments of the method 300 may apply the structural adhesive after joining the first and second parts 12, 14 with the dimension-set adhesive 20.

Path C includes preparation of the semi-solid dimension-set adhesive (such as the semi-solid adhesive 120 shown in FIGS. 4A and 4B). In step 330, the semi-solid adhesive 120 is heated to bring the SMP core portion 138 above the glass temperature. A small amount of solvent is added to the adhesive layers 140 in step 332 to activate or prepare the adhesive.

The semi-solid adhesive 120 is applied between the first and second parts 112, 114 and compressed to the proper dimension in step 334. Step 336 allows the core portion 138 to cool and the adhesive layer 140 to dry. After step 336, the dimensions of the first and second parts 112, 114 are properly set and fixed relative to each other.

The method 300 may include hemming the first and second parts (12, 14, or 112, 114) together in step 338. The dimension-set workpiece may then be transferred to another, third facility, in step 340. At the third facility, the workpiece is subjected to a permanent-curing process (such as oven-curing) in step 342, which forms the permanent, structural bond between the parts.

While the best modes and other embodiments for carrying out the claimed invention have been described in detail, those familiar with the art to which this invention relates will recognize various alternative designs and embodiments for practicing the invention within the scope of the appended claims.

The invention claimed is:

1. A method for joining a first part and a second part, comprising:
    applying a structural adhesive to one of the first and second parts, wherein said structural adhesive is configured to form a permanent bond between the first and second parts when subjected to a permanent-curing process but is not configured to fix the dimensions of the first and second parts without said permanent-curing process;
    applying a dimension-set adhesive to at least one of the first and second parts, wherein said dimension-set adhesive is configured to fix the dimensions of the first and second parts and wherein said dimension-set adhesive is substantially surrounded by said structural adhesive;
    joining the first and second parts with said dimension-set adhesive, wherein said dimension-set adhesive has a first thickness and said structural adhesive has a second thickness, and said first thickness is greater than said second thickness;
    compressing said dimension-set adhesive between the first and second parts to a third thickness, wherein said third thickness is less than said second thickness;
    wherein the first and second parts are not subjected to a mechanical fastening process and are not subjected to a welding process, said mechanical fastening and welding processes being characterized by a requirement for access from opposing sides of the joined first and second parts;
    wherein said structural adhesive is not subjected to a partial-curing process prior to said permanent-curing process; and
    forming said permanent bond between the first and second parts with said structural adhesive by subjecting the first and second parts to said permanent-curing process, wherein said permanent-curing process is an oven-curing process.

2. The method of claim 1, wherein said dimension-set adhesive is a double-sided tape which includes a compressible foam core.

3. The method of claim 1, wherein said dimension-set adhesive is formed from a shape memory polymer core with a water-based adhesive coating.

4. The method of claim 3, wherein said water-based adhesive coating is polyvinyl alcohol.

5. The method of claim 1, wherein said dimension-set adhesive is formed from a shape memory polymer core with a hot-melt adhesive coating.

6. The method of claim 5, wherein said hot-melt adhesive coating is poly(ethylene-vinylacetate).

7. The method of claim 1, wherein said dimension-set adhesive is formed from two adhesive layers with a hook-and-loop core therebetween.

8. A method for joining a first part and a second part, comprising:
   applying a structural adhesive to one of the first and second parts, wherein said structural adhesive is configured to form a permanent bond between the first and second parts when subjected to a permanent-curing process but is not configured to fix the dimensions of the first and second parts without said permanent-curing process;
   applying a dimension-set adhesive to at least one of the first and second parts, wherein said dimension-set adhesive is configured to fix the dimensions of the first and second parts;
   joining the first and second parts with said dimension-set adhesive;
   wherein the first and second parts are not subjected to a mechanical fastening process and are not subjected to a welding process;
   wherein said dimension-set adhesive has a first thickness and said structural adhesive has a second thickness, and said first thickness is greater than said second thickness;
   compressing said dimension-set adhesive between the first and second parts to a third thickness, wherein said third thickness is less than said second thickness;
   wherein said structural adhesive is not subjected to a partial-curing process prior to said permanent-curing process; and
   forming said permanent bond between the first and second parts with said structural adhesive by subjecting the first and second parts to said permanent-curing process, wherein said permanent-curing process is an oven-curing process.

9. The method of claim 8, wherein said dimension-set adhesive is a double-sided tape which includes a compressible foam core.

10. The method of claim 8, wherein said dimension-set adhesive is formed from a shape memory polymer core with a water-based adhesive coating.

11. The method of claim 10, wherein said water-based adhesive coating is polyvinyl alcohol.

12. The method of claim 8, wherein said dimension-set adhesive is formed from a shape memory polymer core with a hot-melt adhesive coating.

13. The method of claim 12, wherein said hot-melt adhesive coating is poly(ethylene-vinylacetate).

14. The method of claim 8, wherein said dimension-set adhesive is formed from a semi-solid core portion with at least two adhesive layers, and said semi-solid core portion is configured for plastic deformation.

15. The method of claim 8, further comprising:
   isolating said dimension-set adhesive from said structural adhesive; and
   forming an extended tab portion on one of the first and second parts, wherein said dimension-set adhesive is located on said extended tab portion.

16. The method of claim 8, wherein said dimension-set adhesive is substantially surrounded by said structural adhesive.

* * * * *